United States Patent [19]

Bloemendaal et al.

[11] 4,225,923
[45] Sep. 30, 1980

[54] ILLUMINATION APPARATUS

[75] Inventors: John F. Bloemendaal, Rochester; Arthur M. Boone; Alexander B. Zanolli, both of Pittsford, all of N.Y.

[73] Assignee: Eastman Kodak Company, Rochester, N.Y.

[21] Appl. No.: 930,287

[22] Filed: Aug. 2, 1978

[51] Int. Cl.² .............................................. F21V 7/00
[52] U.S. Cl. .................................. 362/301; 362/303; 362/346; 362/349; 355/67
[58] Field of Search ............... 362/346, 347, 349, 297, 362/300, 301, 303; 355/67, 71

[56] References Cited

U.S. PATENT DOCUMENTS

| 1,631,610 | 6/1927 | Wood | 362/297 |
|---|---|---|---|
| 3,302,519 | 2/1967 | Young . | |
| 3,428,397 | 2/1969 | Elmer | 355/67 |
| 3,586,849 | 6/1971 | Starkweather et al. . | |
| 3,588,492 | 6/1971 | Pollock | 362/347 |
| 3,777,135 | 12/1973 | Rees . | |
| 3,804,513 | 4/1974 | Ogawa | 355/67 |
| 3,920,311 | 11/1975 | Tsuda et al. | 362/297 |
| 3,982,116 | 9/1976 | Sakuma . | |
| 4,092,066 | 5/1978 | Kawai | 355/67 |
| 4,118,761 | 10/1978 | Day | 362/297 |

Primary Examiner—Monroe H. Hayes
Attorney, Agent, or Firm—D. M. Woods

[57] ABSTRACT

Illumination apparatus provides for uniform illumination of a planar original by use of a single flash lamp. A pair of parabolic reflectors partially surround the lamp and direct two separate collimated bundles of light toward opposite sides of the original. A planar reflector positioned in the path of each collimated bundle of light intercepts and reflects the collimated light rays upon the original to uniformly illuminate the original from opposite sides.

6 Claims, 3 Drawing Figures

ILLUMINATION APPARATUS

BACKGROUND OF THE INVENTION

1. Field of the Invention

This invention generally relates to illumination apparatus, and particularly to an arrangement of light reflectors for efficiently using light emitted from a single light source to uniformly illuminate an original. The present apparatus is particularly useful in illuminating originals in a photographic printer, although the apparatus is equally adapted for use with other types of copiers, e.g., electrographic copiers.

2. Description Relative to the Prior Art

Apparatus for illuminating an original generally falls into two categories, each adapted to achieve the same result by a different engineering approach. One approach involves illuminating a slit through which the original is line-imaged by an optical system upon a photosensitive surface. Either the original moves past the illuminated slit or the slit moves over a stationary original to achieve the same result. In both cases the image is built up line by line on the photosensitive surface. The other approach involves illuminating an entire copy plane in which the original is positioned. The latter approach requires at least a momentary phase in the copy cycle when all parts of the original may be simultaneously imaged on the photosensitive surface, i.e., the image of the document is at least momentarily stationary with respect to the photosensitive surface. For example, a short exposure of the original effectively "freezes" motion with respect to a moving photosensitive belt.

Exemplary of the first approach is U.S. Pat. No. 3,982,116 which describes a single light source and an arrangement of mirrors for reflecting light through a slit defined transversely to a copy platen. The mirrors surrounding the light source are designed to converge light rays to a line focus beyond the slit. By placing an original on the platen, and moving the platen relative to the slit, the converging light rays scan the surface of the original.

The second approach is illustrated by copy machines described in each of U.S. Pat. Nos. 3,586,849 and 3,777,135. In each machine, an original is placed upon a transparent support platen mounted relative to an illumination lamp assembly. In order to provide homogeneous illumination, four lamps are orthogonally spaced around each edge of the original. By means of reflectors with compound surfaces (i.e., both planar and curved surfaces), light rays emitted from each lamp are reflected upon the surface of the original such that they overlap and complement rays from the opposing lamp. The light rays reflect upon the surface of the original and produce image light corresponding to the informational areas on the original. The image light transverses an optical system and exposes the photosensitive surface of a flexible photoconductive belt arranged on a belt assembly.

The application served by these conventional approaches involves substantially opaque material situated in a copier such that light reflects from the opaque surface to a photosensitive surface. Unlike a transparency, which may be illuminated from a light source substantially on the optical axis of the copier, the light source for reflection copying is offset from the optical axis; otherwise the illumination source would block the image from reaching the photosensitive surface. In practice, because uniform illumination is required, it is common to use several light sources. Each source is spaced from one side of the opaque original.

Illumination of an original using a plurality of light sources is a satisfactory approach in some applications. However, in other applications this approach has significant limitations. For example, in a photographic printer where an image is projected from a color print to photosensitive color paper, the spectral characteristics of each lamp must be considered in arriving at proper exposure times and color filtration for a given paper. Not only do many lamps differ initially in spectral distribution, but lamp aging causes the distribution for each lamp to change at an individual rate.

The potential for unwanted color variability therefore increases as the number of light sources increase. Matching the lamps with proper filters to maintain a proper spectral distribution is difficult at best. To worsen matters, the burden is thrown upon the photofinisher rather than the manufacturer. Each light source would require its own set of color filters to control the spectral characteristic of light from that source. The mere number of components that must therefore be matched becomes unmanageable. The present invention effectively reduces this problem by providing uniform illumination with a single light source.

SUMMARY OF THE INVENTION

Illumination apparatus is provided for illuminating an object with light rays from an elongated light source. The object is supported in spaced relationship with the light source to receive the light rays. Means are included for collimating some of the light rays originating from the source and directing these collimated rays along a predetermined path. Reflecting means are positioned in the predetermined path for reflecting the collimated light rays to the object to illuminate the object.

More particularly, a pair of parabolic reflecting surfaces are positioned parallel to and adjacent the light source. Each parabolic reflector collimates and reflects some light rays from the source along respective predetermined paths on opposite sides of a planar object. A pair of planar reflecting surfaces are positioned in the respective paths to receive light reflected from the parabolic reflectors and to reflect the light rays upon the object from opposite sides.

The illumination apparatus is also provided for illuminating the surface of an object positioned in the optical axis of a photographic printer. The light source is supported in spaced relationship with the object and clear of the printing axis. A pair of planar reflectors at opposite sides of the object reflect light rays originating from the source directly upon the object. Two elongated parabolic reflectors are positioned substantially parallel to and adjacent opposite sides of the light source to reflect respective bundles of light rays from each parabolic reflector toward respective of the planar reflectors.

The illumination apparatus of the photographic printer may also include a light baffle positioned between the light source and the object to substantially prevent light rays from passing directly between the source and the object. A light filter is additionally provided between the parabolic reflectors and the object to modify the spectral characteristic of substantially all of the light rays in the respective bundles of reflected rays.

BRIEF DESCRIPTION OF THE DRAWINGS

A preferred embodiment of the invention will be described with reference to the figures, wherein.

DETAILED DESCRIPTION OF THE INVENTION

Because illumination apparatus in general are well known, as are photographic and other copying machines, the present description will be directed in particular to elements forming part of, or cooperating more directly with, the present invention. Elements not specifically shown or described may take various forms well known to those skilled in the art.

Figure 1:
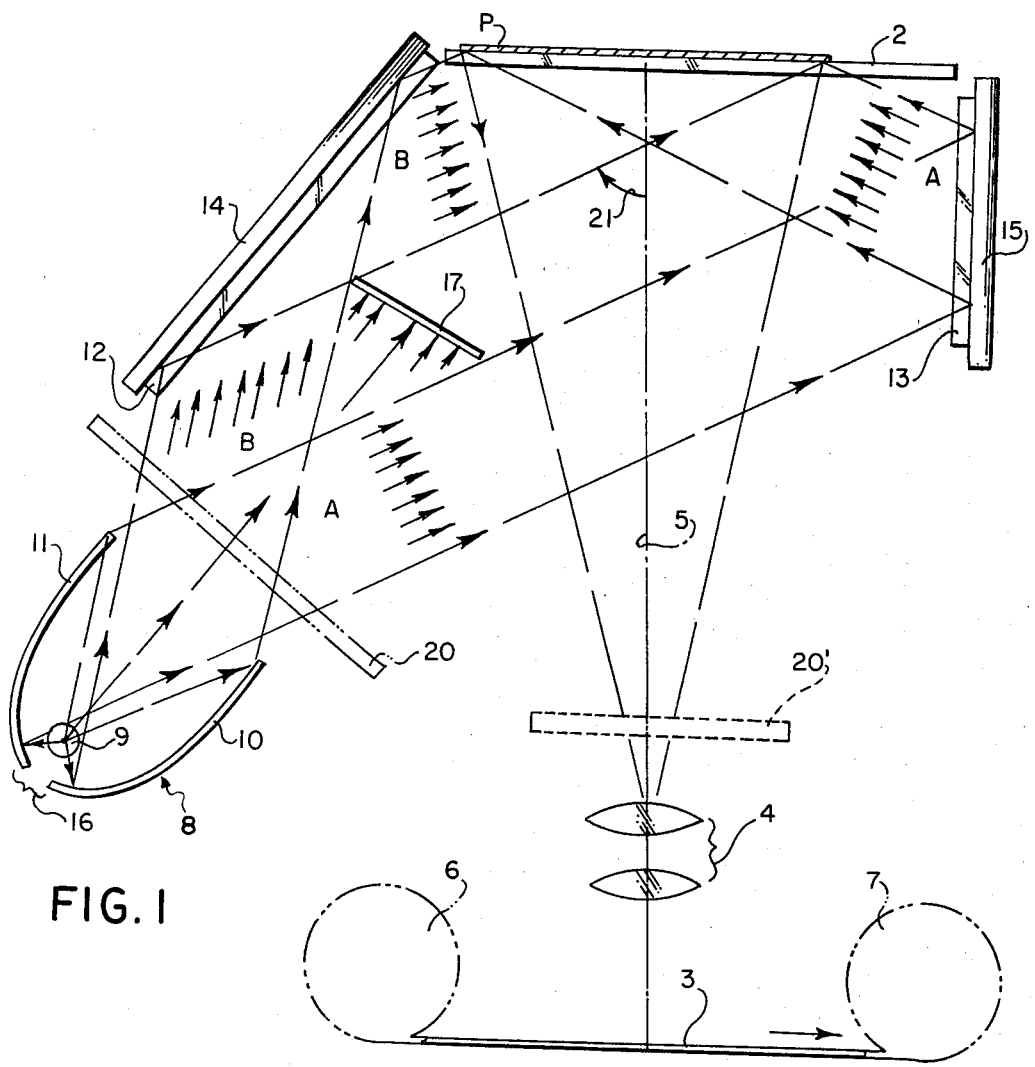
FIG. 1 is a schematic plan view of a presently preferred embodiment of the invention.

Referring particularly to FIG. 1, the illumination apparatus is illustrated as a component in a copy machine. For purposes of illustration, the copy machine is embodied as a photographic printer for producing copies of photographic prints. An original to be reproduced, such as a planar, rectangular print P, is positioned on a transparent copy platen 2 for casting an image on a photosensitive material 3 through a focusing lens 4. The print P is placed on the copy platen 2, as for example, by hand or by suitable transport apparatus (not shown). Being an opaque copy, the print P is imaged in the printer by means of reflected light. As shown, the reflected light generally follows an optical axis 5 of the printer. Therefore, it is desirable that the illumination apparatus not obstruct reflected light passing along the optical axis 5.

The focusing lens 4 can be of any known design which will produce a sharp image on the photosensitive material 3. As shown in phantom the photosensitive material 3 may be a continuous web of photographic paper transported between a supply reel 6 and a take-up reel 7. The reels may be rotated to advance the paper incrementally in conjunction with the placement, and repeated exposure, of prints on the copy platen 2. Apparatus for producing such cyclical and interlocked motion are well known in the art of copiers generally and, more particularly, in the art of photographic printing. After the entire roll of paper is exposed, the latent images are processed in the usual manner and the individual prints are separated for return to the customer.

Figure 2:
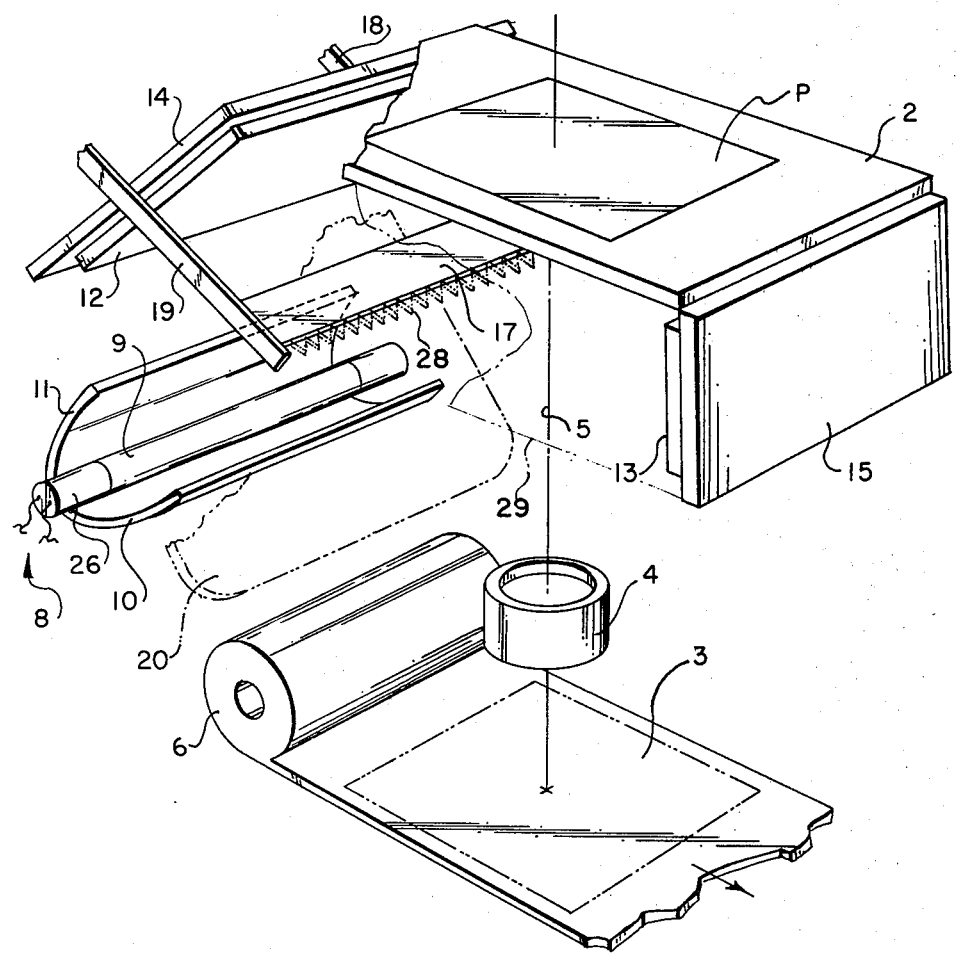
FIG. 2 is a perspective view of the illumination apparatus applied to a photographic printer.

Referring jointly to FIGS. 1 and 2, the illumination apparatus includes a lamphouse 8 having an elongated light source 9 partially surrounded by two half-parabolic reflectors 10 and 11. The light source preferably comprises a small diameter elongated tubular element, such as for example a Xenon-arc tubular lamp, which is electrically connected to a suitable power source (not shown). The light source is positioned in a suitable support, such as the support 26 illustrated in FIG. 2. Because, as earlier mentioned, the optical axis 5 of the printer optical system must not be obstructed, the lamphouse 8 is canted to one side of the axis 5, as best illustrated in FIG. 1.

A pair of planar reflectors 12 and 13 are provided adjoining the copy platen 2 for diverting light from the lamphouse 8 to the copy platen 2. Being transparent, the platen 2 permits light to substantially transmit through and illuminate the print P. Each mirror 12 and 13 is aluminum coated so that absorption and dispersion is minimized to produce high efficiency diversion of the impinging light rays. The mirrors 12 and 13 are mounted on supporting members 14 and 15, respectively. Each support 14 and 15 is positioned with respect to the copy platen 2 so that at least the area bounded by the print P is fully illuminated by light reflected from each of the mirrors 12 and 13. The amount of inclination of the mirror 12 with respect to the copy platen 2 is a function of the angle of reflection of impinging light rays upon the mirror 12. Similarly the inclination of the mirror 13 depends on the angle of the rays impinging upon it.

Figure 3:
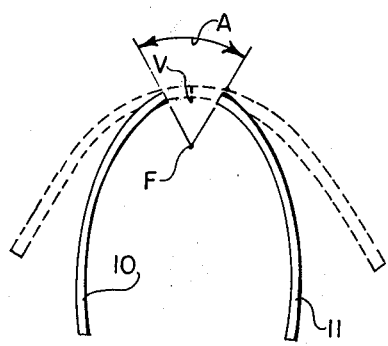
FIG. 3 is a geometrical representation of the parabolic mirrors used in the disclosed embodiment.

The light source 9 is partially surrounded by the pair of parabolic reflectors 10 and 11. As shown by geometrical representation in FIG. 3, each parabolic reflector 10 and 11 represents half of a fully parabolic surface that is separated at its vertex V and rotated about its focus axis F by an angle A. The halves thus remaining each coincide with half of a separately positioned new parabola. The optimum angle A will vary depending on the orientation of all the mirrors in the optical system; however an angle of 50° was found to be satisfactory in the disclosed embodiment.

The light source 9 is placed substantially at the principal focus line F of both reflectors. Since the parabolic surfaces are cylindrical in their lengthwise direction the principal focus is also linear. Therefore the length of source 9 is closely aligned with the linear focus of the half parabolic segments 10 and 11. As is well known, light rays which emanate from a point source at the focus of a parabolic mirror are collimated, i.e., parallel, after they reflect from its surface. The light source 9, being nominally at the focus of each of the parabolic mirrors 10 and 11, emits light rays which reflect from each mirror as two separate bundles of substantially parallel rays. The separation of light rays into two bundles is effected by the use of two half-parabolic reflectors positioned as previously described to have a common focus line (see FIG. 3).

By thus separating the reflecting surfaces, a gap—denoted by reference character 16—is formed between reflectors 10 and 11. It is also desirable to prevent light rays from reaching the platen from the light source 9. These rays are not collimated and, for reasons hereinafter described, their angle of incidence upon the platen is less than desired. For these reasons, a light baffle 17 is provided between the light source 9 and the copy platen 2. Light rays impinging on the baffle are either absorbed or harmlessly reflected out of the illumination apparatus. As best shown in FIG. 2, the baffle 17 is attached to the copy platen 2 by means of a pair of brackets 18 and 19.

Particularly in a photographic printer, it may be desirable to provide color filtration for light striking the print P. For example, the spectral characteristics of the lamp 9 may not match that of the photographic material 3 and filter compensation will need to be provided. Also, since spectral characteristics of the lamp 9 may change with lamp age, it may be necessary to periodically adjust the amount of filtration. Having but one light source 9 simplifies the filtration in comparison with conventional systems using a plurality of lamps (usually four). By providing a color filter 20 in the path of light emanating from the lamphouse 8, all light striking the print P—and thus the photographic material 3—is effectively modified as to spectral characteristics. Alternatively or additionally, a filter may be placed between the print P and the photosensitive material 3—as depicted by reference character 20'—to correct reflected image light reflected from the print P. However the filter 20 has been found satisfactory for printing from prints onto photographic paper. In any event, the selection and placement of the filter(s) is within the capability of those skilled in the art.

The operation of the illumination apparatus can best be described in terms of the light rays pattern illustrated in FIG. 1. The bundle A of light rays reflect from the parabolic mirror 11 to the planar reflector 13. From there the rays reflect back across the copy platen 2 and illuminate the print P. The bundle B of light rays reflect from the parabolic mirror 10 to the planar reflector 12. From there the rays reflect back across the copy platen 2 and also illuminate the print P. It will be noted that the light rays in each bundle remain substantially parallel after each reflection. Therefore light intensity per unit area due to impinging rays is substantially constant across the length and width of the print P. Furthermore, the intensity pattern of each bundle A and B of light rays substantially complement each other on the face of the copy platen 2—and therefore on the face of print P—making the illumination on the print substantially uniform.

It was found that certain angles of incidence of the light rays caused deleterious effects in the photographic image on the photosensitive material 3. For example, if the angle of light incidence relative to the optical axis 5—as indicated by a reference character 21—is less than about 65°, specular reflection may occur on the surface of the print P and reflect directly into the optical system through the lens 4 and onto the photosensitive material 3. This effect is particularly pronounced if the print P has a strongly textured surface. Consequently the illumination apparatus is designed to bring light rays onto the copy platen 2 at an angle of at least 65°. This angle, and any greater angle, was found to prevent the unwanted specular reflection. Lesser angles increase specular reflection in the case of textured prints; however such angles may be acceptable if non-textured prints are being illuminated.

Some of the light rays emanate directly from the light source 9 without striking the parabolic reflectors 10 or 11. A portion of these rays strike the planar reflectors 12 or 13 and, because of their angle of incidence, either reflect out of the illumination apparatus or contribute to the illumination of the print P. Those rays illuminating the print P are few compared to the collimated rays and are effectively swamped by the latter so that uniform illumination remains unaffected. Furthermore, the angle at which these rays impinge on the print P is at least 65° relative to the optical axis 5 so that the aforementioned specular reflection is not a problem. However, another portion of these direct light rays could strike the copy platen 2—and therefore the print P—without reflecting from any surface. These rays will impinge at an angle substantially less than 65° and therefore cause serious specular reflection from a print P that is strongly textured. As earlier described, the light baffle 17 is positioned to block direct rays from striking the copy platen 2. The light baffle 17 also prevents the portion of direct rays causing specular reflection from striking the print P. While the baffle 17 may be a rectangular plate for purposes of blocking direct rays, in some orientations of the components in the system it was found beneficial if the baffle 17 was provided with teeth 28 (see FIG. 2). It is believed that the toothed edge diffuses the light rays and thereby provides better illumination of the edge of the print P.

Also it will be apparent that the disclosed apparatus can be used with various types of originals other than prints, e.g., positive or negative transparencies, plain paper originals, etc. While the disclosed illumination apparatus has been described with reference to a photographic printer it will be apparent to those skilled in the art that it is not limited to this specific application. For example, in FIG. 1 the photosensitive surface 3 could equally well be the photoconductive surface of an electrographic belt assembly. After exposure to the original, the belt 3 could be advanced through conventional electrographic processing stations, e.g., toning and developing, image transfer, cleaning, charging, etc.

The bundles A and B of light rays reflected from the parabolic reflectors 10 and 11 include light paths collimated in relation to the thickness or cross-section of each bundle. However, each bundle includes light rays that are travelling obliquely across the width-wise dimension of the bundle, i.e., the dimension perpendicular to the plane of FIG. 1. Such rays appear collimated in cross-section (as shown in FIG. 1) while diverging from the useful portion of the bundle and generally bearing off the axis of the lamp 9. These rays leave the illumination apparatus without striking the planar reflectors 12 and 13. Such rays may instead be collected by a pair of end reflectors 29 (shown in cut-away phantom on one side only in FIG. 2) and diverted back toward the planar reflectors 12 and 13. From there the light rays reflect back upon the copy platen 2, thereby contributing to illumination of the print P.

The invention has been described in detail with particular reference to preferred embodiments thereof, but it will be understood that variations and modifications can be effected within the spirit and scope of the invention.

What is claimed is:

1. An illumination apparatus for illuminating a planar object with a single elongated light source, said apparatus comprising:
    means for positioning the object in an illumination position;
    a pair of parabolic reflecting surfaces positioned parallel to and adjacent said light source to reflect light rays from said source along paths on opposite sides of the object when the object is in said illumination position; and
    a pair of planar reflecting surfaces positioned in said paths respectively to receive the light rays reflected from said parabolic reflecting surfaces respectively and to reflect the respective light rays upon the object from opposite sides thereof.

2. An illumination apparatus for providing uniform illumination of a flat rectangular object when the object is in a predetermined position, said apparatus comprising:
    an elongated light source positioned generally in parallel with two opposing sides of the rectangular object;
    a pair of elongated parabolic reflecting surfaces positioned substantially parallel to and adjacent said light source to form two collimated light beams from light rays emanating from said source, each beam being directed toward a respective one of the two opposing sides of the object; and
    a pair of planar reflecting surfaces positioned adjacent the opposing sides of the object and in the path of respective collimated light beams from said parabolic reflecting surfaces to reflect the light beams upon the object from the opposing sides.

3. The illumination apparatus of claim 2 wherein said light source and said parabolic reflecting surfaces are positioned outside the boundary of the object.

4. An illumination apparatus for use a single elongated light source for illuminating the surface of an object positioned in the optical axis of a photographic printer, the apparatus comprising:
   means for supporting the light source in spaced relationship with the object and clear of the optical axis;
   a pair of planar reflecting surfaces positioned at opposite sides of the object to reflect light rays originating from the source directly upon the object; and
   two elongated parabolic reflecting surfaces, each positioned substantially parallel to and adjacent opposite sides of said source to reflect respective bundles of light rays from the opposing parabolic surfaces toward respective of said planar reflecting surfaces.

5. The illumination apparatus of claim 4 further comprising a light baffle positioned between said light source and the object to substantially prevent light rays from passing directly between the source and the object and;

6. The illumination apparatus of claim 4 further comprising a light filter positioned between said parabolic reflecting surfaces and the object in the path of said respective bundles of light rays to modify the spectral characteristics of substantially all of the light in said bundles of rays.

* * * * *

UNITED STATES PATENT AND TRADEMARK OFFICE
CERTIFICATE OF CORRECTION

PATENT NO. : 4,225,923

DATED : September 30, 1980

INVENTOR(S) : John F. Bloemendaal, Arthur M. Boone and Alexander B. Zanolli

It is certified that error appears in the above-identified patent and that said Letters Patent are hereby corrected as shown below:

Column 8, line 11, delete "and;" and substitute therefor--.--.

Column 1, line 56, delete "transverses" and substitute therefor--traverses--.

Column 5, line 9, delete "rays" and substitute therefor--ray--.

Signed and Sealed this

Twenty-third Day of June 1981

[SEAL]

Attest:

RENE D. TEGTMEYER

Attesting Officer

Acting Commissioner of Patents and Trademarks